(12) United States Patent
Abe et al.

(10) Patent No.: US 6,556,238 B1
(45) Date of Patent: Apr. 29, 2003

(54) COLOR-BAR SIGNAL GENERATION UNIT COMPATIBLE WITH PLURALITY OF TELEVISION SIGNAL FORMATS

(75) Inventors: Satoru Abe, Sakura (JP); Yoshiyuki Abe, Saitama-ken (JP); Kihei Yoshida, Tokyo (JP); Yasushi Kasuga, Kawasaki (JP); Tadashi Kenmotsu, Tokyo (JP)

(73) Assignee: ASAHI National Broadcasting Co., Ltd., Tokyo (JP)

( * ) Notice: Subject to any disclaimer, the term of this patent is extended or adjusted under 35 U.S.C. 154(b) by 441 days.

(21) Appl. No.: 09/630,365

(22) Filed: Aug. 1, 2000

(30) Foreign Application Priority Data

Jun. 1, 2000 (JP) .................................... 2000-164454

(51) Int. Cl.[7] .............................................. H04N 17/02
(52) U.S. Cl. ........................ 348/182; 348/181; 348/180; 348/445
(58) Field of Search ................................. 348/182, 180, 348/181, 184, 186, 177, 645, 649, 650, 652, 445; 345/904, 690; 358/504, 520; 382/167

(56) References Cited

U.S. PATENT DOCUMENTS

| 3,529,079 | A | * | 9/1970 | Moskovitz et al. ......... 348/182 |
| 4,089,026 | A | * | 5/1978 | Wilhelm et al. ............ 348/182 |
| 4,758,877 | A | * | 7/1988 | Slavin ....................... 348/182 |
| 4,879,590 | A | * | 11/1989 | Guillot et al. ............. 348/182 |
| 4,914,506 | A | * | 4/1990 | Kafer et al. ............... 348/182 |
| 5,194,936 | A | * | 3/1993 | Jeon ......................... 348/182 |
| 5,345,263 | A | * | 9/1994 | Miller ....................... 348/182 |
| 6,178,254 | B1 | * | 1/2001 | Rappette et al. ........... 382/112 |
| 6,456,293 | B1 | * | 9/2002 | Grandy ...................... 345/591 |

* cited by examiner

Primary Examiner—John Miller
Assistant Examiner—Jean W. Désir
(74) Attorney, Agent, or Firm—Venable; Norman N. Kunitz

(57) ABSTRACT

A color-bar signal generation unit compatible with a plurality of television signal formats is provided. The color-bar signal generation unit in accordance with the present invention includes first, second, and third color-bar signal generators for generating a color-bar signal that represents a 16:9 aspect ratio color-bar test pattern, and a color-bar signal switch for switching outputs of the generators. The color-bar signal is structured to contain a 75% color-bar signal and 100% color-bar signals. The 75% color-bar signal represents a portion of the color-bar test pattern defined with an aspect ratio of 4:3 and serves as an NTSC color-bar signal. The 100% color-bar signals represent portions of the color-bar test pattern outside the portion with the aspect ratio of 4:3 and serve as components of an HD color-bar signal. Consequently, the color-bar signal can be used in common for the HD format stipulating the aspect ratio of 16:9 and the NTSC format stipulating the aspect ratio of 4:3.

4 Claims, 9 Drawing Sheets

Details of Color-Bar Test Pattern

FIG. 3A

Waveforms of Green, Blue and Red Signals

FIG. 3B

Waveforms of Luminance and Chrominance Signals

FIG. 4A

Waveforms of Green, Blue and Red Signals

FIG. 4B

Waveforms of Luminance and Chrominance Signals

FIG. 5A

Waveforms of Green, Blue and Red Signals

FIG. 5B

Waveforms of Luminance and Chrominance Signals

FIG. 6

Output Signal of Down-Converter (NTSC/4:3, Levels in %)

(A) Waveform of First Color-Bar Signal (B) Waveform of Second Color-Bar Signal

(C) Waveform of Third Color-Bar Signal

FIG. 7

Output Signal of Down-Converter (Setup of 7.5%)
(NTSC/4:3, Levels in %)

(A) Waveform of First Color-Bar Signal (B) Waveform of Second Color-Bar Signal

(C) Waveform of Third Color-Bar Signal

FIG. 8

Display Presented by HD Vector Scope

(A) Display Indicating Color-Bar Signal in Normal Gain Mode (B) Display Indicating +I Signal in Magnification Gain Mode

(C) Display Indicating Face Color Signal in Magnification Gain Mode

FIG. 9

Display Presented by NTSC Vector Scope
(Without Setup of 7.5%)

(A) Display Indicating Color-Bar
Signal in Normal Gain Mode (B) Display Indicating +I Signal
in Magnification Gain Mode (C) Display Indicating Face Color
Signal in Magnification
Gain Mode

FIG. 10

Control of Hue and Saturation on HD Monitor (A) Color-Bar Test Pattern of SMPTE (B) Color-Bar Test Pattern of Present Invention

FIG. 11
Control of Luminance on SD Monitor
(Output Signal of Down-Converter)

(A) Color-Bar Test Pattern of SMPTE (B) Color-Bar Test Pattern of Present Invention

COLOR-BAR SIGNAL GENERATION UNIT COMPATIBLE WITH PLURALITY OF TELEVISION SIGNAL FORMATS

BACKGROUND OF THE INVENTION

1. Field of the Invention

The present invention relates to a color-bar signal generation unit compatible with a plurality of television signal formats. More particularly, this invention is concerned with a color-bar signal generation unit for generating a color-bar signal that enables broadcasting conforming to both the high-definition television (HD) format and the standard-definition television (SD) format including the National Television System Committee-recommended (NTSC) format. Using the color-bar signal produced by the novel color-bar generation unit in accordance with the present invention, both a 16:9 aspect ratio picture produced in the HD format and a 4:3 aspect ratio picture resulting from conversion of the HD picture into the SD format can be broadcast according to the same procedure as that adopted when a conventional color-bar signal is used.

2. Description of the Related Art

Digital broadcasting falls into HD broadcasting and SD broadcasting which deliver pictures of different sizes or aspect ratios of 16:9 and 4:3, respectively. Moreover, ongoing broadcasting conforming to the NTSC format may be used. It is therefore becoming a matter of common practice that programs are produced in the HD form, which offers high image quality and which permits the aspect ratio of 16:9, are converted into the SD (including the NTSC) format, and are then broadcast. A color-bar signal is an important signal providing a reference for optimizing pictures. Even when a video signal format is converted into one conforming to the SD format, the color-bar signal should preferably not be replaced with another in order to preserve the original picture.

Preferably, one color-bar signal enables both HD broadcasting and SD broadcasting (including broadcasting conforming to the NTSC format). Using the color-bar signal, both the 16:9 aspect ratio HD picture and the 4:3 aspect ratio picture resulting from conversion of the HD picture into the SD format can be broadcast according to the same procedure as that adopted when a conventional color-bar signal is used.

At present, a 100%-full-color-bar signal is employed in HD broadcasting, and a 100%- or 75%-full-color-bar signal or an SMPTE color-bar signal (a color-bar signal recommended by the Society of Motion Picture and Television Engineers (SMPTE)) is employed in SD broadcasting.

According to the present invention, what is referred to as a 100%-full-color-bar signal (or simply, a color-bar signal) is a color-bar signal that contains red, green and blue color signals whose levels corresponds to 100% of their designed level. Moreover, this color-bar signal represents a color-bar test pattern composed of color bars that include red, green, and blue bars, and combinations thereof and that are arranged over a whole screen in descending order of the level of a relevant luminance signal from the left side of the screen. What is referred to as a 75%-full-color-bar signal is a color-bar signal containing red, green, and blue color signals whose levels correspond to 75% of their designed level. This color-bar signal also represents a color-bar test pattern composed of color bars that include red, green, and blue bars, and combinations thereof and that are arranged over a whole screen in descending order of the level of a relevant luminance signal from the left side of the screen.

These color-bar signals are structured in conformity with the different video signal formats. The color-bar signal structured in conformity with the HD format (16:9) is not intended to be used even after the video signal format is converted into one conforming to the SD format (4:3) (this conversion shall be referred to as down-conversion). The SMPTE color-bar signal contains a chroma control signal for use in controlling saturation on a monitor. Nevertheless, the SMPTE color-bar signal is employed in NTSC broadcasting.

The chroma control signal for use in controlling saturation on an SMPTE monitor cannot be used to control saturation on an HD monitor that handles a luminance signal and chrominance signals as signal components.

Along with down-conversion of the video signal format representing a program, a color-bar signal conforming to the HD format (16:9) must be down-converted into one conforming to the SD format (4:3), representing a color-bar test pattern displayed on a full screen. At this time, signal components representing portions of the color-bar test pattern that appear on both sides of the screen are cut off. The resultant signal cannot therefore be used as a color-bar signal. The color-bar signal must therefore be replaced with another. However, the replacement impairs the original video signal. For this reason, there is an increasing demand for a color-bar signal usable in common for the HD and SD formats.

For NTSC (SD) broadcasting, the SMPTE color-bar signal (75%-full-color-bar signal) is usually adopted. The HD 100%-full-color-bar signal resulting from down-conversion may be taken for the 75%-full-color-bar signal differs from the HD 100%-full-color-bar signal solely in terms of the signal level. Moreover, when the level of the color-bar signal is adjusted incorrectly and broadcast, a broadcasting error occurs.

A vector scope is used to manage colors of a picture produced in the NTSC form. In particular, a color of a face (flesh color) reflects the condition of health. Viewers are conscious of the face color. Therefore, a video signal is magnified with the amplitude of a color burst used as a reference in order to monitor the face color (FIG. 9C). However, an HD video signal containing a luminance signal and chrominance signals as components does not have a component corresponding to the color burst contained in the NTSC video signal.

Figure 11:
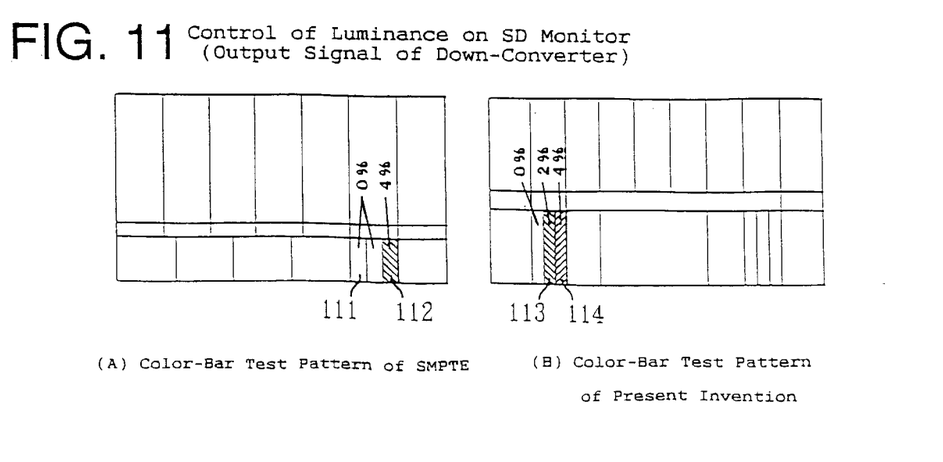
FIG. 11A and FIG. 11B are concerned with control of luminance on an SD monitor.

Signals whose levels correspond to ±2% of the designed level are adopted as luminance control signals used to control luminance on a monitor and are contained in an HD color-bar signal. Signals whose levels correspond to ±4% thereof are adopted as the luminance control signals contained in an SD color-bar signal. However, a down-converter does not output signal components of negative levels (numeral 63 in FIG. 6 or numeral 71 in FIG. 7). Therefore, the signal whose level corresponds to −4% thereof cannot be adopted as one of the luminance control signals contained in the SD color-bar signal (numerals 111 and 112 in FIG. 11).

Figure 10:
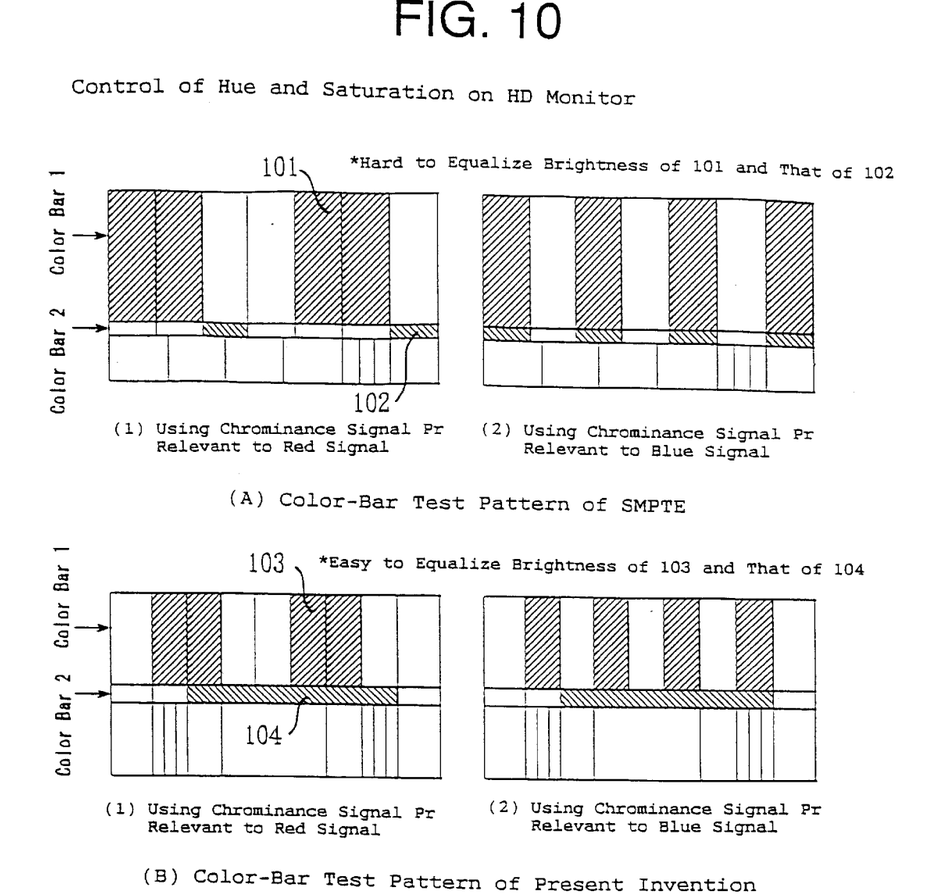
FIG. 10A and FIG. 10B are concerned with control of hue and saturation on a HD monitor.

The SMPTE color-bar signal employed in NTSC broadcasting cannot be used to control saturation on an HD monitor that handles a luminance signal and chrominance signals as signal components (FIG. 10A).

SUMMARY OF THE INVENTION

An object of the present invention is to provide a color-bar signal generation unit compatible with a plurality of television signal formats.

In detail, an object of the present invention is to provide a color-bar signal generation unit for generating a color-bar signal enabling both HD broadcasting and SD broadcasting (including NTSC broadcasting). Using the color-bar signal produced by the novel color-bar signal generation unit in accordance with the present invention, both a 16:9 aspect ratio HD picture of and a 4:3 aspect ratio picture resulting from conversion of the HD picture into the SD format can be broadcast according to the same procedure adopted when a conventional color-bar signal is used.

The first point to which the present inventors have directed their attention in efforts to accomplish the foregoing object will be described below. In general, the problems underlying the related art are presumably solved by producing a color-bar signal composed of an HD color-bar signal and an SD color-bar signal. The HD color-bar signal is assign to a 16:9 aspect ratio color-bar test pattern for HD broadcasting, while the SD color-bar signal is assigned to a 4:3 aspect ratio color-bar test pattern for SD broadcasting. However, the waveform of the color-bar signal displayed on a waveform monitor becomes more complex than that of a conventional one. A conventional method of observing the waveform using the waveform monitor must therefore be modified.

Figure 2:
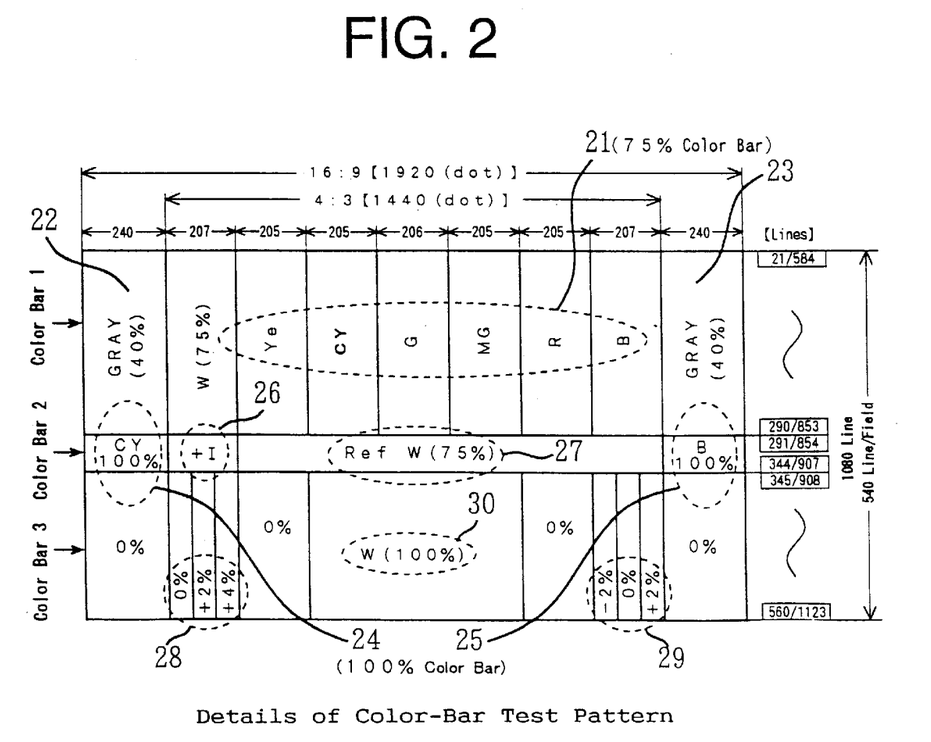
FIG. 2 shows the structure of a color-bar test pattern represented by all the components of a digital signal produced in the HD format (video signal format 1080$i$) by the unit of the embodiment.

According to the present invention, the 4:3 aspect ratio SD portion of the 16:9 aspect ratio HD color-bar test pattern is represented by a 100% white signal and a 75% color-bar signal that serve as an NTSC color-bar signal. Portions outside the SD portion are represented by part of a 100% color-bar signal serving as the HD color-bar signal (FIG. 2). This is attributable to the fact that the portions of the HD color-bar test pattern outside the SD portion are used merely as part of the HD color-bar test pattern.

Reasons why part of the 100% color-bar signal serves as the HD color-bar signal will be described below.

When a color-bar signal is used to adjust or check the level of a video signal produced by a television system, the levels of red, green, and blue signals contained in the video signal can be adjusted using a 100% white signal. For adjusting the levels of a luminance signal Y and chrominance signals Pb and Pr, reference signals are needed.

(1) The level of the luminance signal Y is adjusted using the 100% white signal contained in the SD color-bar signal.

(2) For adjusting the chrominance signal Pb contained in the video signal, the level of the chrominance signal Pb relevant to a yellow signal(Ye) contained in the color-bar signal is brought to −50% of the designed level. The level of the chrominance signal Pb relevant to a blue signal(B) contained therein is brought to +50% thereof. Both or either of a 100% yellow signal and a 100% blue signal is therefore needed.

(3) For adjusting the chrominance signal Pr contained in the video signal, the level of the chrominance signal Pr relevant to a cyan signal(CY) contained in the color-bar signal is brought to −50% of the designed level. The level of the chrominance signal Pr relevant to a red (R) signal contained therein is brought to +50% thereof. Both or either of a 100% cyan signal and a 100% red signal is therefore needed.

The HD color-bar signal is used to adjust the level of a video signal in consideration of the points described below.

(1) For adjusting the chrominance signal Pb contained in the video signal, the levels of chrominance signals Pb relevant to the yellow and blue signals contained in the color-bar signal are brought to 100% of their designed level. For adjusting the chrominance signal Pr contained therein, the levels of the chrominance signals relevant to the cyan and red signals contained therein are brought to 100% thereof.

(2) The chrominance signal Pb exhibits a waveform protruding rightward.

Consequently, the chrominance signal Pb relevant to the blue signal contained in a color-bar signal is used to adjust the chrominance signal Pb contained in a video signal. The chrominance signal Pr relevant to the cyan signal contained therein is used to adjust the chrominance signal Pr contained therein. A blue bar is displayed on the right end of a screen, and a cyan bar is displayed on the left end thereof. The blue signal and cyan signal representing the blue and cyan bars are signals whose levels correspond to 100% of their peak value (numerals 24 and 25 in FIG. 2, and numerals 43 and 44 in FIG. 4).

The second point to which the present inventors have directed their attention in efforts to accomplish the aforesaid object will be described below. The SD (4:3) portion of the HD (16:9) color-bar test pattern is represented by a 100% white signal and a 75% color-bar signal that serve as an NTSC color-bar signal (numerals 21 and 30 in FIG. 2). The reasons why the white signal and color-bar signal are adopted will be described below.

(1) The 100% white signal can be shared by the HD color-bar signal representing the HD color-bar test pattern and the SD color-bar signal representing the SD portion, and can be used to control white balance on a monitor.

(2) An SMPTE color-bar test pattern represented by a 75% color-bar signal is usually employed in NTSC broadcasting.

(3) A 100% color-bar signal may be clipped by an NTSC television system when the signal level rises to a level corresponding to about 110%. (The positive peak level of the 100% color-bar signal employed in NTSC broadcasting may reach 133%.)

(4) A scale appearing on an NTSC waveform monitor indicates a maximum level of 120% at a positive side.

(5) Color bars represented with a 100% color-bar signal employed in HD broadcasting are arranged outside the 4:3 portion of the test pattern (numerals 24 and 25 in FIG. 2).

Figure 9:
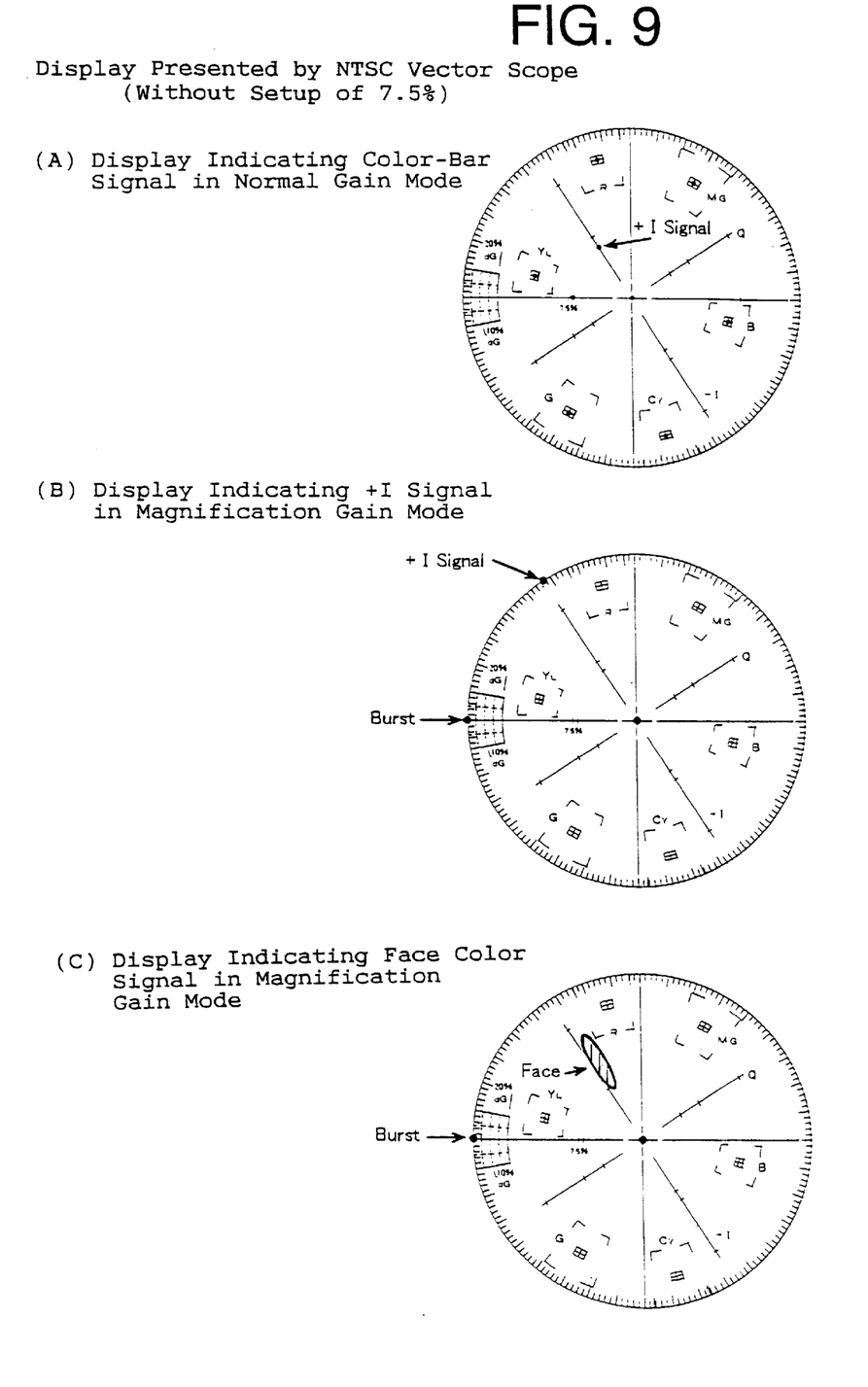

The third point to which the present inventors have directed their attention in efforts to accomplish the aforesaid object will be described below. Namely, a video signal is magnified so that the amplitude of a color burst will be indicated on a circular scale presented by a vector scope. This is intended to facilitate observation of a flesh color in an NTSC picture. A signal representing the flesh color is indicated near an +I axis presented by an NTSC vector scope (FIG. 9C). According to the present invention, a flesh color reference signal meeting the conditions described below is newly added to a color-bar signal (numeral 26 in FIG. 2, numeral 41 in FIG. 4A, numeral 42 in FIG. 4B, and numeral 61 in FIG. 6).

(1) The signal should be indicated to have the same amplitude as the color burst on the +I axis presented by the NTSC vector scope.

(2) The waveform of the signal displayed on the NTSC waveform monitor should not interfere with observation of the waveforms of components of a color-bar signal.

Figure 8:
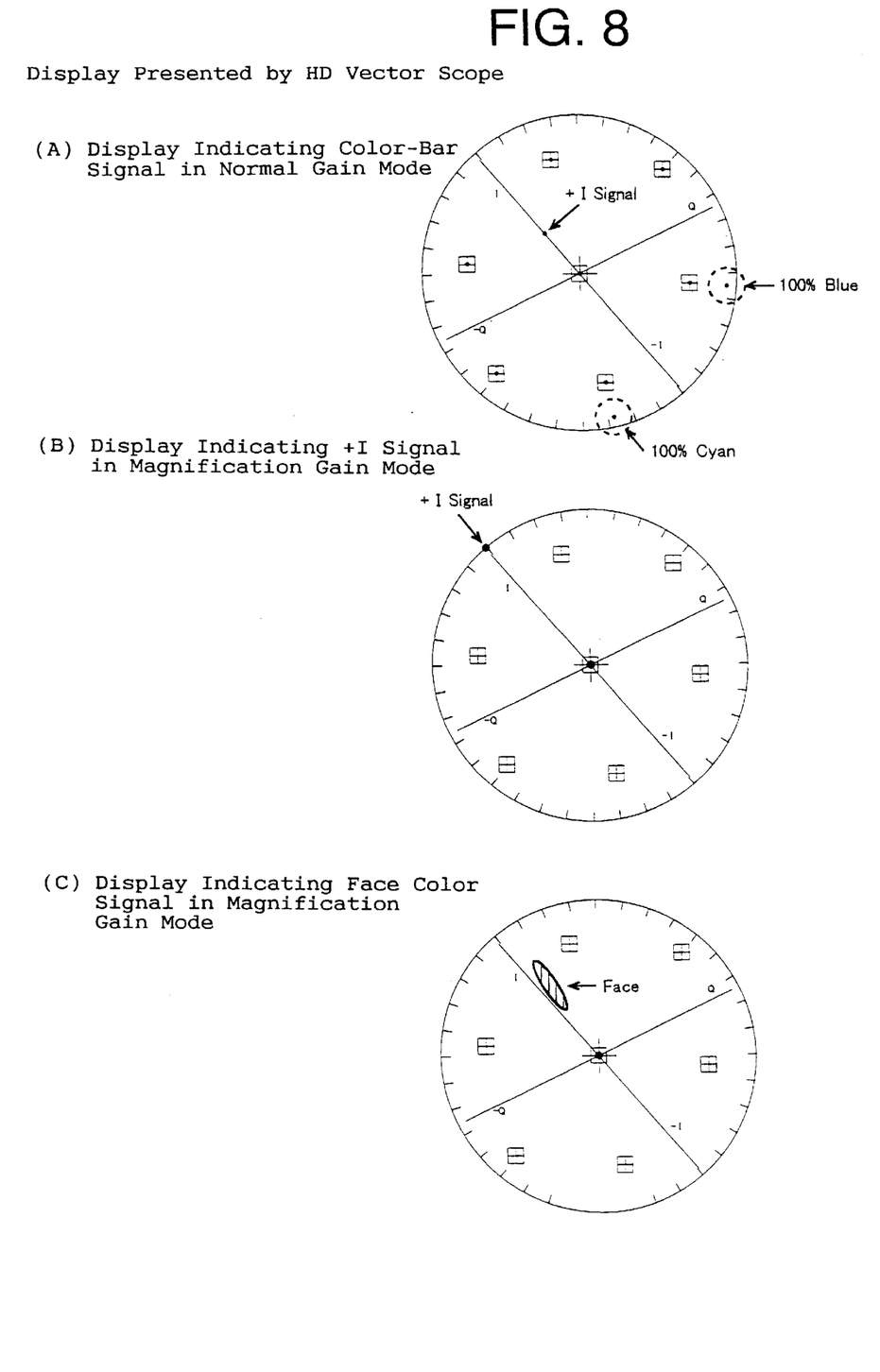

Consequently, when an HD vector scope is used, a video signal is magnified in the same manner as an NTSC video signal, and the foregoing flesh color reference signal (+I signal) is employed. Thus, the flesh color can be monitored in the same manner as that in the NTSC picture (FIG. 8). (In this point, the HD vector scope is analogous to the NTSC vector scope.)

The fourth point to which the present inventors have directed their attention in efforts to accomplish the aforesaid object will be described below. A luminance control signal for use in controlling luminance on a monitor is standardized for each of the HD and SD formats (a ±2% signal is adopted according to the HD format, and a ±4% signal is adopted according to the SD format). However, when a color-bar signal is down-converted into the SD format, signal components of negative levels are not output. According to the present invention, a +2% signal is substituted for a −4% signal contained in an SD color-bar signal (numeral 28 in FIG. 2, numeral 51 in FIG. 5A, and numeral 62 in FIG. 6). For controlling luminance on a monitor, a color bar represented by the +4% signal is made visible on the monitor but a color bar represented with the +2% signal is made invisible (numerals 113 and 114 in FIG. 11). The luminance is controlled to fall within the range of luminance values attained in the monitor using the ±4% signals.

The fifth point to which the present inventors have directed their attention in efforts to accomplish the aforesaid object will be described below. Assuming that color bars represented with a red signal and its relevant signals alone contained in an SMPT color-bar signal are displayed on a monitor in order to adjust the chrominance signal Pr contained in a video signal, a color bar represented with a reference signal serving as a reference for comparison disappears from a monitor. This makes it impossible to relatively equalize the brightness of a color bar and that of the reference color bar while viewing the monitor. Consequently, the chrominance signal Pr contained in the video signal cannot be adjusted (numerals 101 and 102 in FIG. 10).

According to the present invention, a reference white signal of level 75% is used as a chroma control reference signal for use in controlling saturation on a monitor. The color bar represented by the 75% reference white signal is displayed adjacently to other color bars, which are represented by a 75% color-bar signal, on the monitor. When the chrominance signal Pr contained in a video signal is adjusted, a red signal contained in the 75% color-bar signal is varied. However, the 75% reference white signal representing the white bar adjacent to the red bar will not be varied. In principle, the red and white signals have a level corresponding to 75% relative to their designed level. For adjusting the chrominance signal Pr, therefore, only the color bars represented by the red signal and its relevant signals contained in the color-bar signal are displayed on the monitor. Then, the brightness of the red bar and that of the white bar (numerals 103 and 104 in FIG. 10) are relatively equalized.

According to the present invention, there is provided a color-bar signal generation unit including first, second, and third color-bar signal generators for generating a color-bar signal that represents a 16:9 aspect ratio color-bar test pattern, and a color-bar signal switch for switching outputs of the generators. Herein, the color-bar signal representing the 16:9 aspect ratio color-bar test pattern contains a 75% color-bar signal and 100% color-bar signals. The 75% color-bar signal represents a portion of the color-bar test pattern defined with the aspect ratio of 4:3 and serves as an NTSC color-bar signal. The 100% color-bar signals represent portions thereof outside the portion with the aspect ratio of 4:3 and serve as components of an HD color-bar signal. Thus, the color-bar signal representing a 16:9 aspect ratio color-bar test pattern is used in common for the HD format stipulating the aspect ratio of 16:9 and the NTSC format stipulating the aspect ratio of 4:3.

In the color-bar signal generation unit, a flesh color signal may be acquired in order to enable monitoring of the hue of the flesh color using a vector scope.

In the color-bar signal generation unit, a white signal having the same level as a signal that represents a color-bar test pattern may be used as a chroma control reference signal. A white bar represented by the signal is displayed adjacent to color bars in order to enable control of saturation on an HD monitor that handles a luminance signal and chrominance signals as signal components or an SD monitor that handles these signals in the form of a composite signal.

In the color-bar signal generation unit, three signals of positive levels including a zero level may be included in order to enable control of luminance on a monitor.

When a color-bar signal generated by the color-bar signal generation unit is employed in broadcasting a 16:9 aspect ratio HD picture, even if the HD picture is down-converted into the SD form (including the NTSC format stipulating the aspect ratio of 4:3), the color-bar signal need not be replaced with another but can be used as it is.

BRIEF DESCRIPTION OF THE DRAWINGS

FIG. 6A to FIG. 6C are explanatory diagrams concerning an output signal provided through a terminal 6 when an output of the color-bar signal generation unit shown in FIG. 1 is down-converted into the NTSC form (4:3), wherein FIG. 6A shows the waveform of a color-bar signal 1, FIG. 6B shows the waveform of a color-bar signal 2, and FIG. 6C shows the waveform of a color-bar signal 3;

FIG. 7A to FIG. 7C are explanatory diagrams concerning an output signal, having a setup of 7.5%, provided through the terminal 6 when an output of the color-bar signal generation unit shown in FIG. 1 is down-converted into the NTSC (4:3) form, wherein FIG. 7A shows the waveform of a color-bar signal 1, FIG. 7B shows the waveform of a color-bar signal 2, and FIG. 7C shows the waveform of a color-bar signal 3;

FIG. 8A to FIG. 8C show examples of a display produced by an HD vector scope indicating a color-bar signal produced by the color-bar signal generation unit in accordance with the present invention, wherein FIG. 8A shows a display indicating the color-bar signal in a normal gain mode, FIG. 8B shows a display presented when a gain produced by the vector scope is adjusted so that a +I signal will be magnified and indicated on a circular scale presented by the vector scope, and FIG. 8C shows a display indicating a face color signal in the magnification gain mode;

FIG. 9A to FIG. 9C show examples of a display produced by an NTSC vector scope when a color-bar signal is down-converted into the NTSC (4:3) format, wherein FIG. 9A shows a display indicating a color-bar signal in a normal gain mode, FIG. 9B shows a display presented when a gain produced by the vector scope is adjusted so that a +I signal will be magnified and indicated on a circular scale presented by the vector scope, and FIG. 9C shows a display indicating a face color signal in the magnification gain mode, and wherein FIG. 8C and FIG. 9C indicate the interrelationship between the HD and NTSC vector scopes and the efficiencies thereof in terms of monitoring of a flesh color (face color) using a flesh color reference signal (+I signal);

DESCRIPTION OF THE PREFERRED EMBODIMENT

Figure 1:
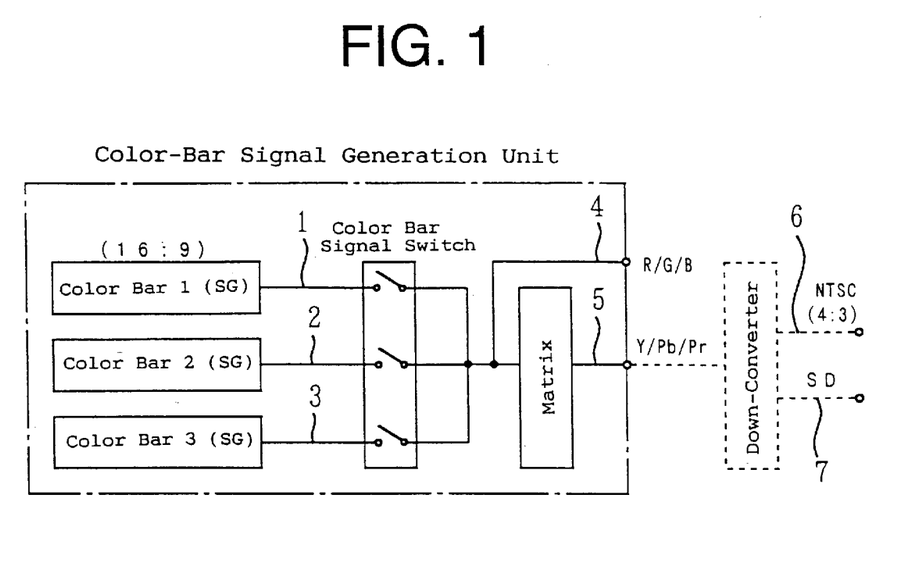
FIG. 1 is a block diagram showing a color-bar signal generation unit in accordance with an embodiment of the present invention.

Referring to the drawings, an embodiment of the present invention will be described below. FIG. 1 shows the embodiment of the present invention. A color-bar signal generation unit comprises a first color-bar signal generator, a second color-bar signal generator, a third color-bar signal generator, a color-bar signal switch, and a matrix. A down-converter is illustrated in order to explain the use of a color-bar signal converted into the SD (4:3) format.

As shown in FIG. 1, the color-bar signal generation unit in accordance with the present invention provides one output signal (at one of terminals 1, 2, and 3 in FIG. 1) produced by the three signal generators and switched by the color-bar signal switch. The output signal represents a color-bar test pattern as shown in FIG. 2. Moreover, the output signal consists of red, green, and blue color signals (a terminal 4 in FIG. 1), and a luminance signal Y and chrominance signals Pb and Pr (a terminal 5 in FIG. 1) produced by converting the color signals through the matrix. FIG. 3, FIG. 4, and FIG. 5 show in detail the signals observed at terminals 1, 2, 3, 4, and 5 shown in FIG. 1.

Figure 6:
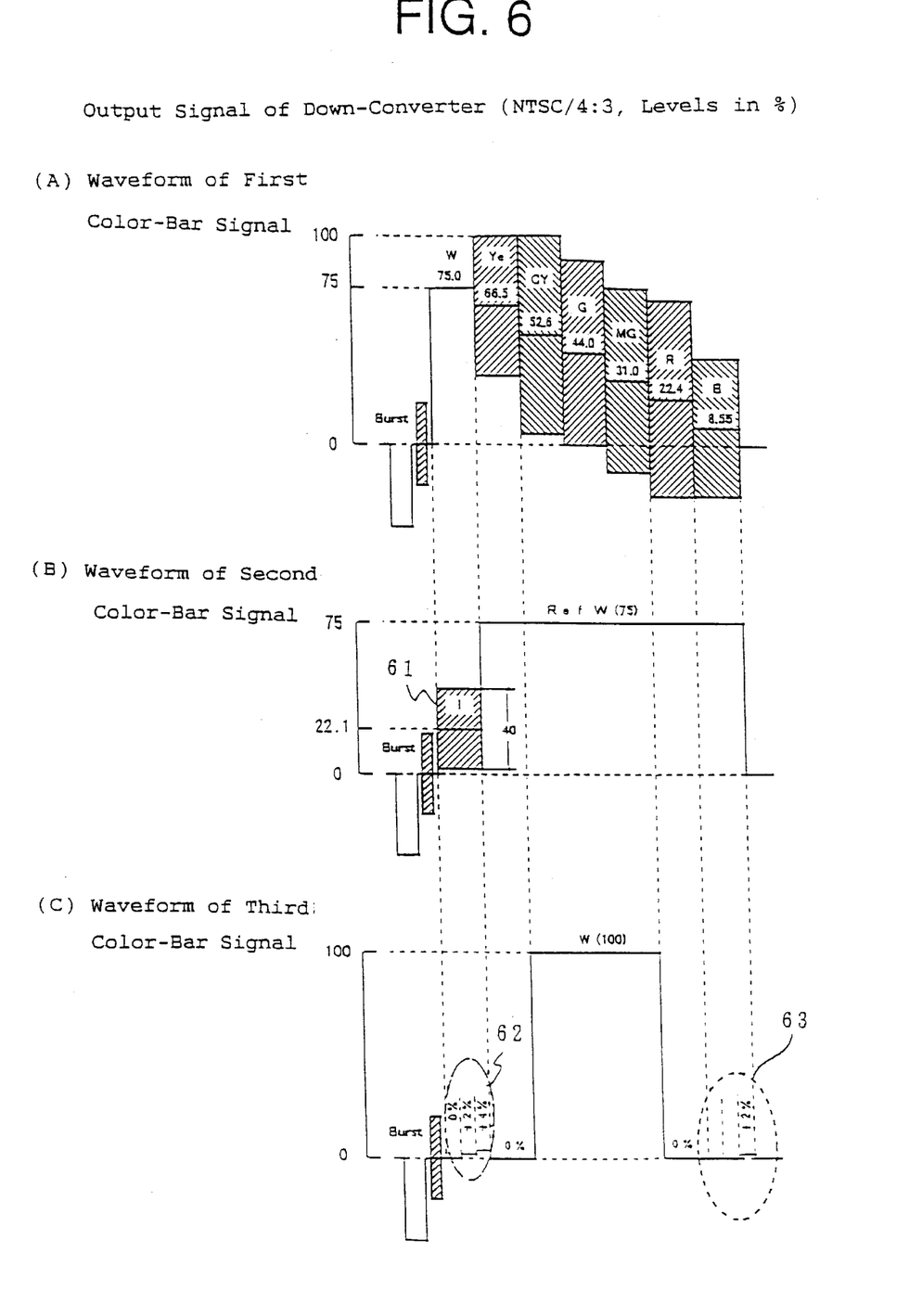
Figure 7:
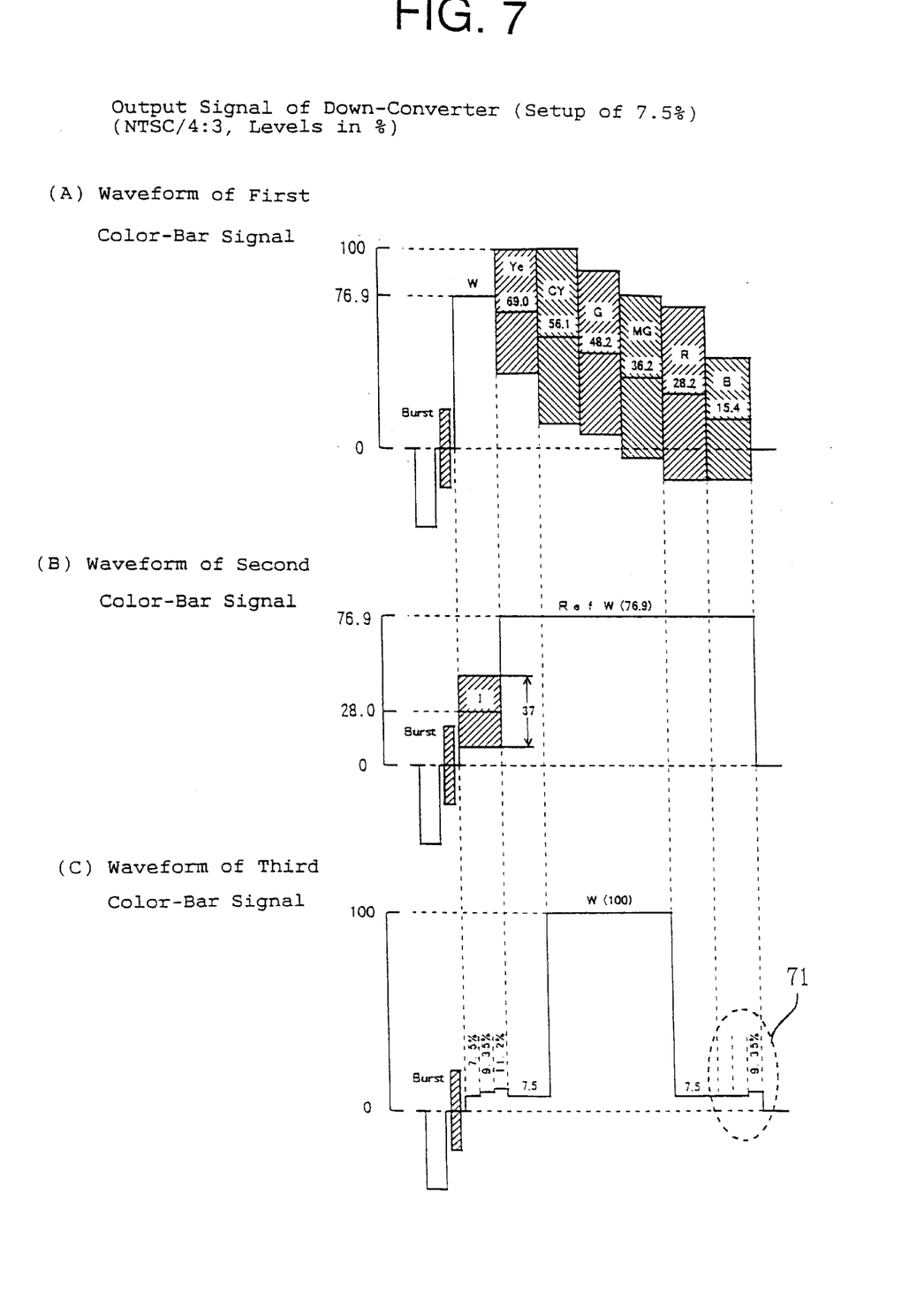

The color-bar signal generation unit in accordance with the present invention is characterized in that it can output a signal resulting from down-conversion and conforming to the SD (4:3) format. FIG. 6 and FIG. 7 show in detail the signal resulting from down-conversion into the SD (NTSC) format. FIG. 2 shows a color-bar test pattern represented by all components of a digital signal produced in the HD form (video signal format 1080i). A portion of a first color-bar test pattern with an aspect ratio of 16:9 that is defined with the aspect ratio of 4:3 is represented by a 75% color-bar signal 21. Portions outside the 4:3 aspect ratio portion are represented by 40% gray (achromatic color) signals 22 and 23. The color-bar signal 21 is used to adjust the level of a video signal produced by an NTSC (SD) television system, and also used to control the characteristics of a monitor. The signals 22 and 23 are used to adjust an average picture level (APL) of the color-bar signal.

A second color-bar test pattern has a portion, which is associated with a white bar of the first color-bar test pattern represented by a 75% white signal, represented by a flesh color reference signal (+I signal) 26. Portions of the second color-bar test pattern associated with the gray bars of the first color-bar test pattern represented by the 40% gray signals are represented by cyan and blue signals 24 and 25. The cyan and blue signals 24 and 25 are contained in a 100% color-bar signal (the left color bar is represented by the cyan signal, while the right color bar is represented by the blue signal). A portion of the second color-bar test pattern associated with the portion of the first color-bar test pattern starting with the yellow bar and ending with the blue bar is represented by a 75% reference white signal 27.

The flesh color reference signal is used as a reference signal to monitor flesh color using a vector scope. Moreover, the flesh color reference signal is indicated on a +I axis in a display presented by an NTSC vector scope. The level of the flesh color reference signal is the same as that of a color burst contained in a color-bar signal exhibiting a setup of 0%. Moreover, the level of a luminance signal relevant to the flesh color reference signal is the lowest (numeral 41 in FIG. 4A, numeral 42 in FIG. 4B, and numeral 61 in FIG. 6).

The levels of the +I signal contained in the red, green, and blue signals are calculated as 41.2545% relative to the designed level of the red signal, 16.6946% relative to that of the green signal, and 0% relative to that of the blue signal according to the expressions below. Herein, I=40×½, Q=0, and B=0 shall be set.

I=−0.274557G−0.321344B+0.595901R

Q=−0.522736G+0.311200B+0.211537R

The cyan and blue bars 24 and 25 are used to adjust the levels of the chrominance signals Pb and Pr in an HD television system. The white bar 27 is used to control saturation on an HD monitor that handles a luminance signal and chrominance signals as signal components or an SD monitor that handles these signals in the form of a composite signal. A third color-bar test pattern has a portion, which is associated with the white bar of the first color-bar test pattern represented by the 75% white signal, represented by a luminance control signal 28 for use in controlling luminance on the SD monitor. A portion of the third color-bar test pattern associated with the blue bar of the first color-bar test pattern is represented by a luminance control signal 29 for use in controlling luminance on the HD monitor. A portion of the third color-bar test pattern associated with the cyan, green, and magenta bars of the first color-bar test pattern is represented by a 100% white signal 30. The luminance control signal 28 is used to control luminance on an SD monitor. Specifically, a color bar represented by a +4% signal is made visible on the SD monitor but a color bar represented by a +2% signal is made invisible. The luminance control signal 29 is used to control luminance on an HD monitor. Specifically, a color bar represented by a +2% signal is made visible on the HD monitor but a color bar represented by a −2% signal is made invisible. The 100% white signal 30 is used to adjust the level of a video signal (or the levels of luminance signals Y) and to control white balance on a monitor.

Figure 3A:
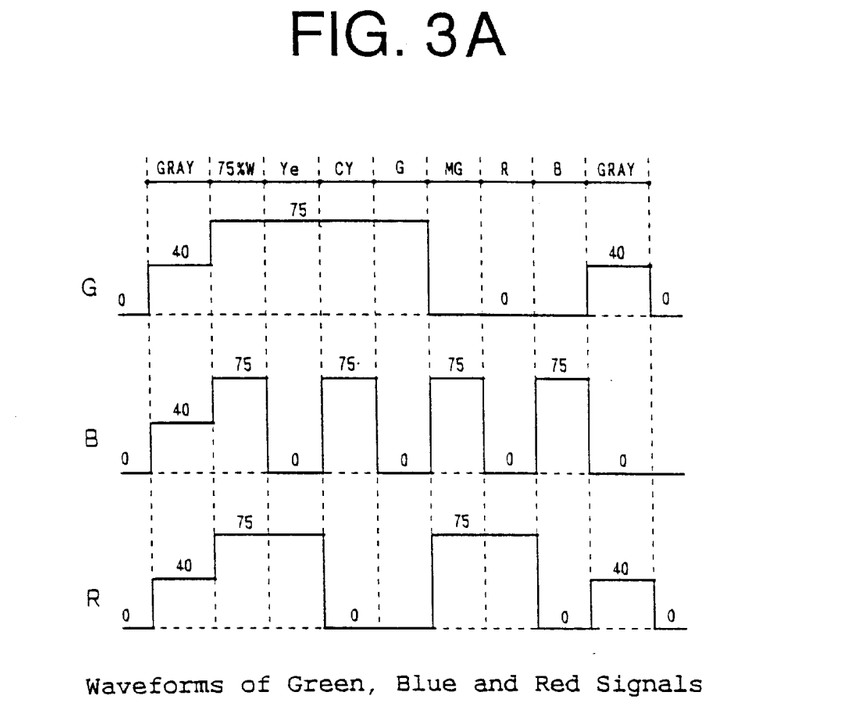
FIG. 3A shows the waveforms of green, blue, and red signals output from a first color-bar signal generator included in the color-bar signal generation unit shown in FIG. 1 through a terminal 4.
Figure 3B:
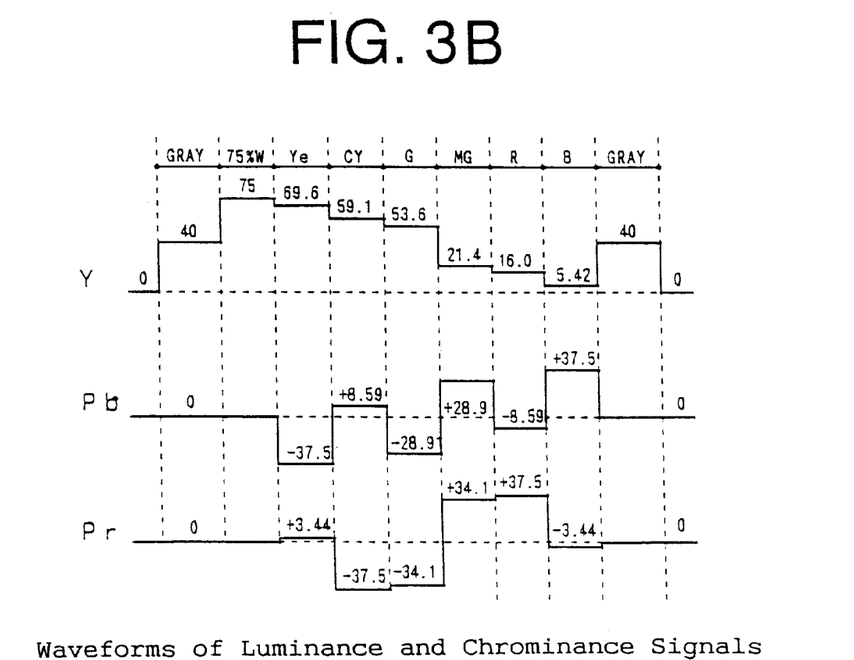
FIG. 3B shows the waveforms of a luminance signal Y and chrominance signals Pb and Pr output from the first color-bar signal generator included in the color-bar signal generation unit shown FIG. 1 through a terminal 5.

FIG. 3A and FIG. 3B are explanatory diagrams concerning the output signals of the signal generator constituting the first color-bar signal. FIG. 3A shows the waveforms of the green, blue, and red signals contained in the first color-bar signal and output through the terminal 4 shown in FIG. 1. FIG. 3B shows the waveforms of a luminance signal Y and chrominance signals Pb and Pr contained in the first color-bar signal and output through the terminal 5 shown in FIG.

Figure 4A:
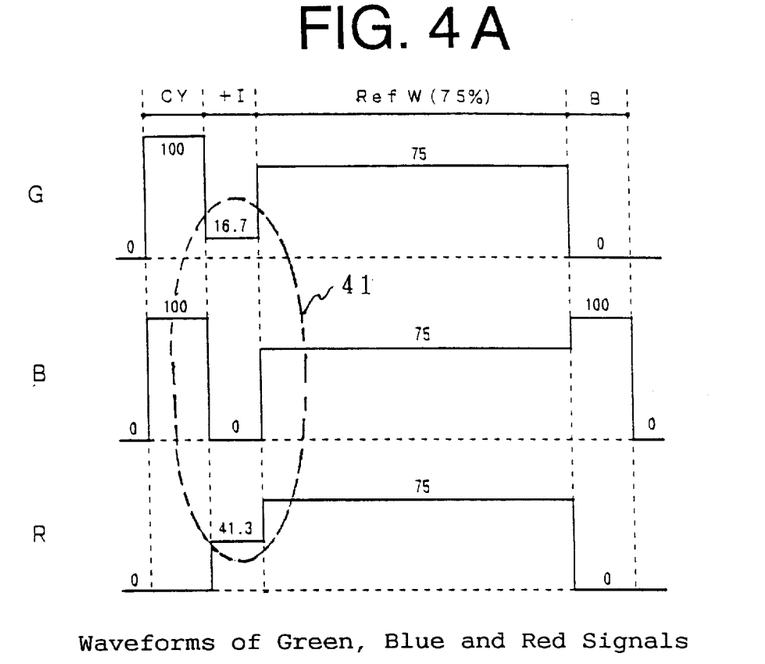
FIG. 4A shows the waveforms of green, blue, and red signals output from a second color-bar signal generator included in the color-bar signal generation unit shown in FIG. 1 through the terminal 4.
Figure 4B:
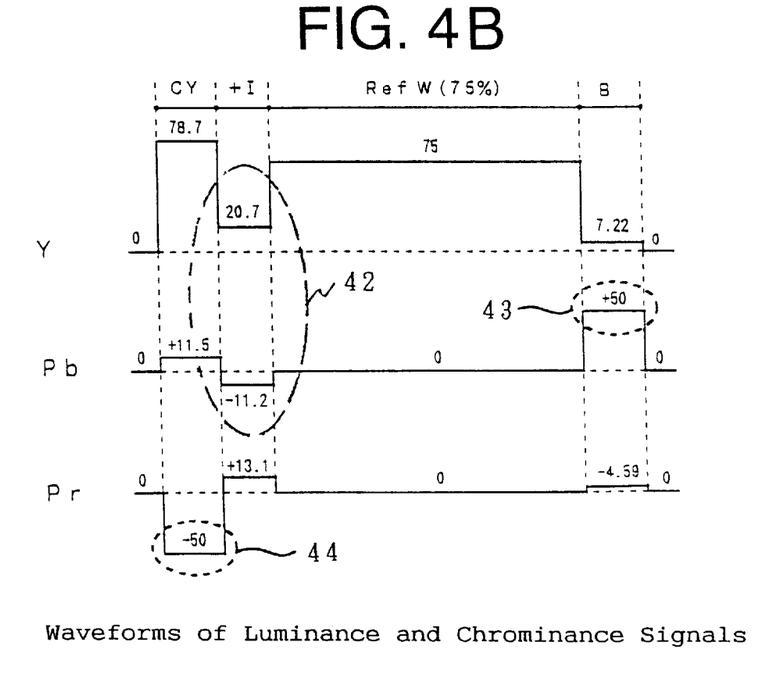
FIG. 4B shows the waveforms of a luminance signal Y and chrominance signals Pb and Pr output from the second color-bar signal generator included in the color-bar signal generation unit shown FIG. 1 through the terminal 5.

1. FIG. 4A and FIG. 4B are explanatory diagrams concerning the output signals of the signal generator constituting the second color-bar signal. FIG. 4A shows the waveforms of the green, blue, and red signals contained in the second color-bar signal and output through the terminal 4 shown in FIG. 1. FIG. 4B shows the waveforms of the luminance signal Y and chrominance signals Pb and Pr contained in the second color-bar signal and output through the terminal 5 shown in FIG. 1.

Figure 5A:
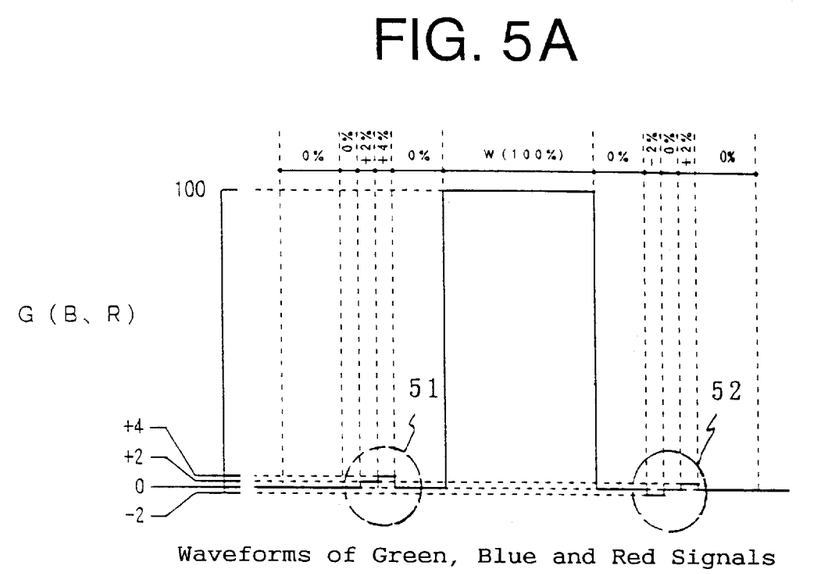
FIG. 5A shows the waveforms of green, blue, and red signals output from a third color-bar signal generator included in the color-bar signal generation unit shown in FIG. 1 through the terminal 4.
Figure 5B:
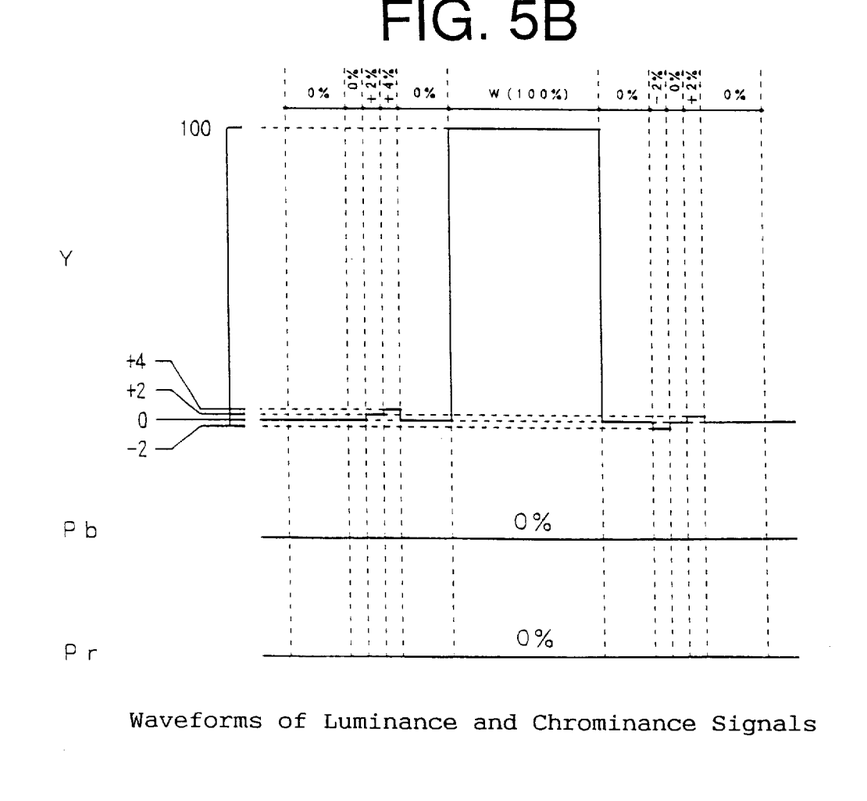
FIG. 5B shows the waveforms of a luminance signal Y and chrominance signals Pb and Pr output from the third color-bar signal generator included in the color-bar signal generation unit shown FIG. 1 through the terminal 5.

FIG. 5A and FIG. 5B are explanatory diagrams concerning the output signals of the signal generator constituting the third color-bar signal. FIG. 5A shows the waveforms of the green, blue, and red signals contained in the third color-bar signal and output through the terminal 4 shown in FIG. 1. The waveforms are identical to each other. A signal component 51 serves as the luminance control signal for use in controlling luminance on an SD monitor, while a signal component 52 serves as the luminance control signal for use in controlling luminance on an HD monitor. FIG. 5B shows the waveforms of the luminance signal Y and chrominance signals Pb and Pr contained in the third color-bar signal and output through the terminal 5 in FIG. 1. Since G=B=R, the chrominance signals Pb and Pr exhibit a zero level.

FIG. 6A to FIG. 6C are explanatory diagrams concerning a signal output through a terminal 6 shown in FIG. 1 when a color-bar signal is down-converted into the NTSC (4:3) format. FIG. 6A shows the waveform of the first color-bar signal, FIG. 6B shows the waveform of the second color-bar signal, and FIG. 6C shows the waveform of the third color-bar signal. A signal component 63 shows that the −2% signal is not output from the down-converter.

FIG. 7A to FIG. 7C show the waveforms of signals, having a setup of 7.5%, output through the terminal 6 shown in FIG. 1 when a color-bar signal is down-converted into the NTSC (4:3) format. FIG. 7A shows the waveform of the first color-bar signal, FIG. 7B shows the waveform of the second color-bar signal, and FIG. 7C shows the waveform of the third color-bar signal. A signal component 71 shows that the −2% signal is not output from the down-converter.

When a color-bar signal is down-converted into the SD format, only the −2% signal out of all the components of the color-bar signal is not output through a terminal 7 shown in FIG. 1. Even in this case, the signals having the waveforms shown in FIG. 3A to FIG. 5B are provided.

FIG. 8A to FIG. 8C show examples of a display presented for indicating a color-bar signal by an HD vector scope according to the present invention. I and Q axes in the drawings correspond to the I and Q axes presented by an NTSC vector scope. FIG. 8A shows a display indicating a color-bar signal in a normal gain mode. FIG. 8B shows a display presented when a gain produced by the vector scope is adjusted so that a +I signal will be magnified and indicated on a circular scale presented by the vector scope (magnification gain mode). FIG. 8C shows a display indicating a face color signal in the magnification gain mode.

FIG. 9A to FIG. 9C show examples of a display presented by the NTSC vector scope when a color-bar signal is down-converted into the NTSC (4:3) format. FIG. 9A shows a display indicating the color-bar signal in the normal gain mode (the display does not have a setup of 7.5%). FIG. 9B shows a display presented when a gain produced by the vector scope is adjusted so that the +I signal will be magnified and indicated on the circular scale presented by the vector scope (magnification gain mode). FIG. 9C shows a display indicating the face color signal in the magnification gain mode. FIG. 8C and FIG. 9C demonstrate the interrelationship between the HD and NTSC vector scopes and the efficiencies thereof in terms of monitoring of the flesh (face) color using the flesh color reference signal (+I signal).

FIG. 10A and FIG. 10B are concerned with control of hue and saturation on an HD monitor. FIG. 10A is concerned with control using an SMPTE color-bar signal. Herein, an attempt is made to adjust chrominance signals Pr contained in a video signal. However, since a color bar 101 of a first color-bar test pattern and a color bar 102 of a second color-bar test pattern are separated from each other, it is difficult to relatively equalize the brightness of the color bar 101 and that of the color bar 102. FIG. 10B is concerned with control using the color-bar signal produced by the color-bar signal generation unit in accordance with the present invention. Herein, an attempt is made to adjust the chrominance signals Pr contained in a video signal. Color bars 103 and 104 of first and second color-bar test patterns are adjacent to each other, and the second color-bar test pattern is represented by a 75% white (achromatic color) signal. The brightness of the color bar 103 and that of the color bar 104 can therefore be relatively homogenized while being unaffected by control of saturation.

FIG. 11A and FIG. 11B are concerned with control of luminance on an SD monitor. FIG. 11A shows an example of an SMPTE color-bar test pattern represented by a signal resulting from down-conversion. Out of 0% and ±4% luminance control signals, the −4% signal is lost (111). The levels of luminance signals contained in a video signal are adjusted using the +4% signal alone (112), and the adjustment is therefore achieved roughly. FIG. 11B is concerned with control of luminance on the SD monitor using the color-bar signal produced by the color-bar signal generation unit in accordance with the present invention. Since 0%, +2%, and +4% signals are used as luminance control signals, the control of luminance can be achieved by making a color bar 114 represented by the +4% signal visible but a color bar 113 represented by the +2% signal invisible.

In digital broadcasting, video signals produced according to various video signal formats are delivered. Programs are produced in consideration of compatibility with the various video signal formats. It is therefore becoming a matter of common practice that programs are produced in the HD (16:9) format and are down-converted in order to broadcast SD programs (including 4:3).

If part of a color-bar signal is lost due to down-conversion into the SD (4:3) format, the color-bar signal must be replaced with another. This replacement of the color-bar signal prevents smooth broadcasting, and impairs the original raw signal. The replacement is undesirable.

A color-bar signal produced by a color-bar signal generation unit in accordance with the present invention has components providing a solution to the aforesaid problems. Only one color-bar signal enables broadcasting of a 16:9 aspect ratio HD picture and a 4:3 aspect ratio SD (NTSC) picture resulting from down-conversion of the HD picture. This ensures smooth broadcasting that is essential to keep up with the digital broadcasting times, and preserves the original raw signal.

A flesh color reference signal is helpful in monitoring a flesh color using a vector scope that indicates HD or SD color signals. Moreover, the interrelationship between the HD vector scope and an NTSC vector scope can be grasped.

A color-bar signal produced by a color-bar signal generation unit in accordance with the present invention can be used to control the characteristics of an HD monitor that handles a luminance signal and chrominance signals as independent components or an SD (NTSC) monitor that handles these signals in the form of a composite signal.

What is claimed is:

1. A color-bar signal generation unit comprising:

first, second, and third color-bar signal generators for generating a color-bar signal that represents a 16:9 aspect ratio color-bar test pattern; and a color-bar signal switch for switching outputs of said generators, wherein said color-bar signal representing the 16:9 aspect ratio color-bar test pattern contains a 75% color-bar signal that represents a portion of the color-bar test pattern defined with an aspect ratio of 4:3 and that serves as an NTSC color-bar signal, and 100% color-bar signals that represent portions of the color-bar test pattern outside the portion with the aspect ratio of 4:3 and that serve as components of an HD color-bar signal, whereby said color-bar signal representing the 16:9 aspect ratio color-bar test pattern can be used in common for the HD format stipulating the aspect ratio of 16:9 and the NTSC format stipulating the aspect ratio of 4:3.

2. A color-bar signal generation unit according to claim 1, wherein a flesh color signal is provided in order to enable monitoring of the hue of a flesh color using a vector scope.

3. A color-bar signal generation unit according to claim 1, wherein a white signal having the same level as a signal representing a color-bar test pattern is used as a chroma control reference signal, and a color bar represented by the chroma control reference signal is displayed adjacent to other color bars in order to facilitate control of saturation on one of an HD monitor that handles a luminance signal and chrominance signals as components and an SD monitor that handles these signals in the form of a composite signal.

4. A color-bar signal generation unit according to claim 1, wherein three signals having positive levels including a zero level are contained in order to facilitate control of luminance on a monitor.

* * * * *